Nov. 8, 1938.   E. WILDHABER   2,136,269
METHOD AND MEANS FOR PRODUCING GEARS
Filed Oct. 17, 1936   3 Sheets-Sheet 1
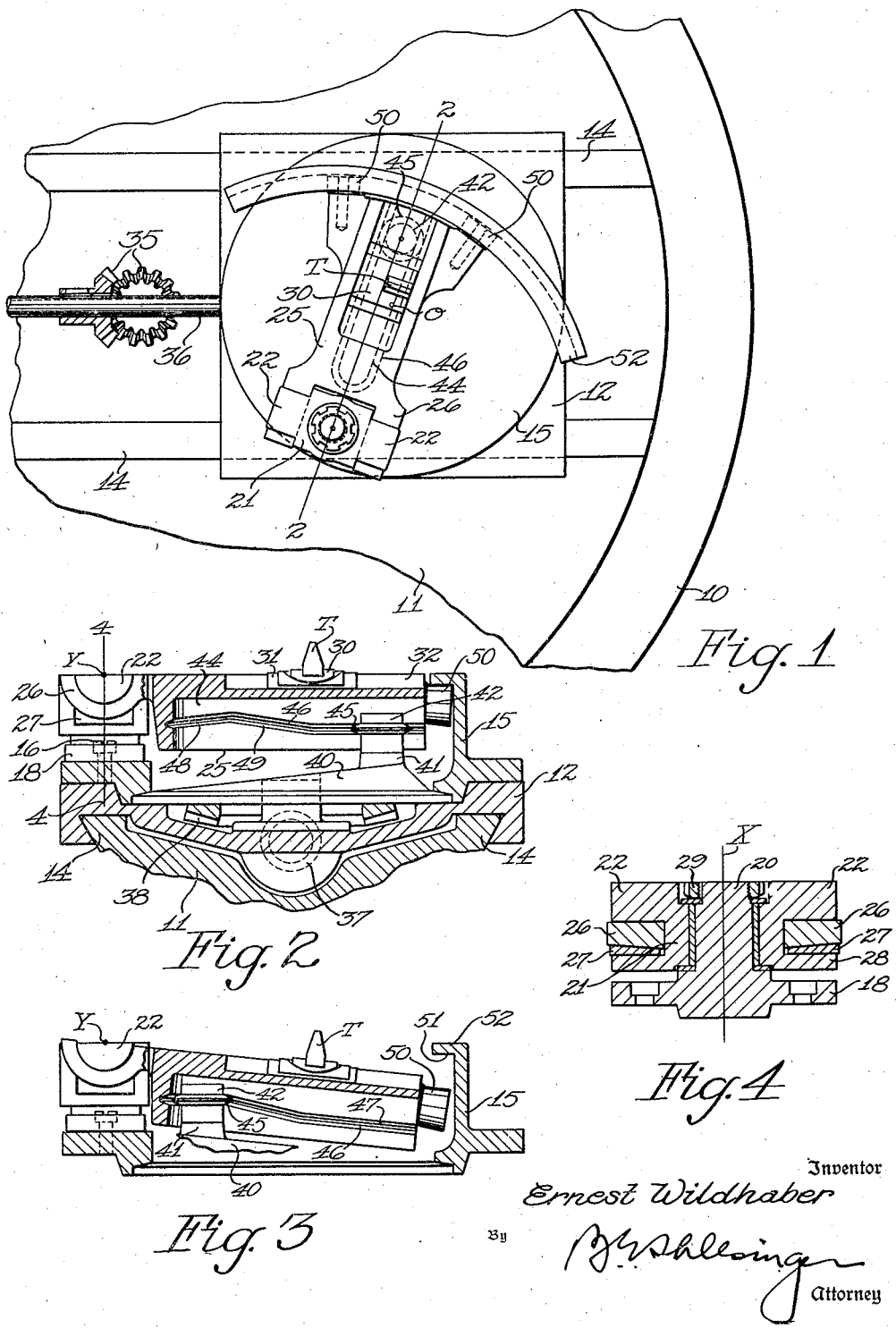

Inventor
Ernest Wildhaber
By
Attorney

Nov. 8, 1938. E. WILDHABER 2,136,269
METHOD AND MEANS FOR PRODUCING GEARS
Filed Oct. 17, 1936 3 Sheets-Sheet 3
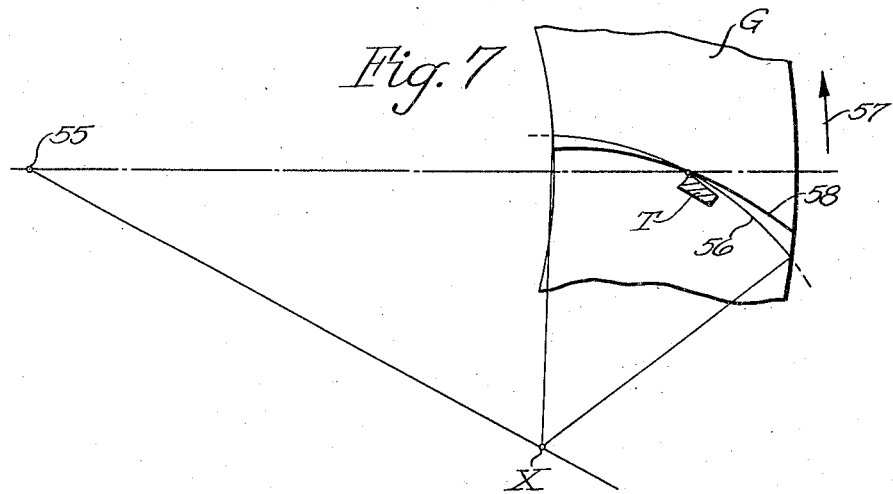
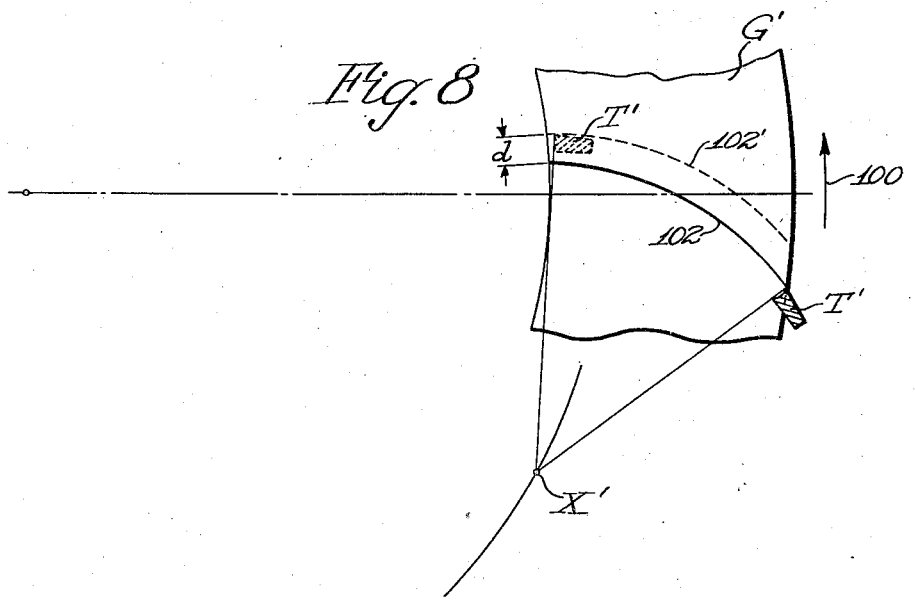
Inventor
Ernest Wildhaber
By
Attorney Patented Nov. 8, 1938

2,136,269

UNITED STATES PATENT OFFICE 2,136,269

METHOD AND MEANS FOR PRODUCING GEARS

Ernest Wildhaber, Irondequoit, N. Y., assignor to Gleason Works, Rochester, N. Y., a corporation of New York Application October 17, 1936, Serial No. 106,133

18 Claims. (Cl. 90—9)

The present invention relates to methods and apparatus for cutting gears and particularly to methods and apparatus for cutting longitudinally curved tooth gears with a planing tool. More specifically, the invention relates to methods and apparatus for cutting spiral bevel and hypoid gears with a planing tool in a continuous indexing process.

One object of the invention is to provide a method and apparatus for cutting longitudinally curved tooth gears in a continuous indexing operation which will permit of the use of a crank drive for reciprocating the cutting tool while obviating the necessity for any correcting motion to compensate for the variable rate of movement of the tool under actuation of the crank.

A further object is to provide a method and apparatus for cutting longitudinally curved tooth gears in a continuous indexing process by which gears may be produced having teeth of circular arcuate longitudinal tooth curvature.

Another object of the invention is to provide a method and apparatus for cutting longitudinally curved tooth gears with a swinging cutting tool which will permit of cutting gears of any desired lengthwise tooth curvature and spiral angle by means of a simple, easily-made adjustment of the cutting tool.

Still another object of the invention is to provide a method and apparatus for cutting longitudinally curved tooth gears with a spread-blade or double-edged tool, that is, a tool for cutting two sides of a tooth space of the gear blank simultaneously, in which there will be no sacrifice of tooth strength or appearance in the gears cut as compared with gears whose tooth surfaces are cut one side at a time.

A further object of the invention is to provide improved mechanism for reciprocating the cutting tool and moving it to and from cutting position, respectively, at opposite ends of its reciprocatory movements which will be very simple and very compact. To this end, it is also a purpose for the invention to provide a simplified tool mechanism in which the means for reciprocating the tool also actuates the means for moving the tool to and from cutting position and a separate drive to the tool relieving mechanism is thereby eliminated.

Still another object of the invention is to provide a method and apparatus for cutting longitudinally curved tooth gears with a reciprocating tool in which a greater portion of the tool stroke may be used for actual cutting than has heretofore been possible.

Still other objects of the invention include the provision of a method of cutting longitudinally curved tooth gears in a continuous indexing process which will require a minimum of calculation and which will be suitable for producing gears in jobbing quantities.

Further objects of the invention will be apparent hereinafter from the specification and from the recital of the appended claims.

The invention is illustrated more or less diagrammatically in the accompanying drawings in which:

Fig. 1 is a fragmentary side elevation of the tool mechanism and cradle of a machine built according to one embodiment of the present invention;

Fig. 2 is a sectional view taken substantially on the line 2—2 of Fig. 1 and showing the tool in cutting position.

Fig. 3 is a corresponding view, but showing the tool in its withdrawn or relieved position;

Fig. 4 is a section on the line 4—4 of Fig. 2;

Fig. 7 is a diagrammatic view illustrating the method employed and the type of lengthwise tooth curvature produced when a gear is cut with the apparatus shown in Figs. 1 to 4 inclusive; and Fig. 8 is a diagrammatic view illustrating the method of operation and the type of lengthwise tooth curve produced when a gear is cut with apparatus such as shown in Figs. 5 and 6.

Figure 5:
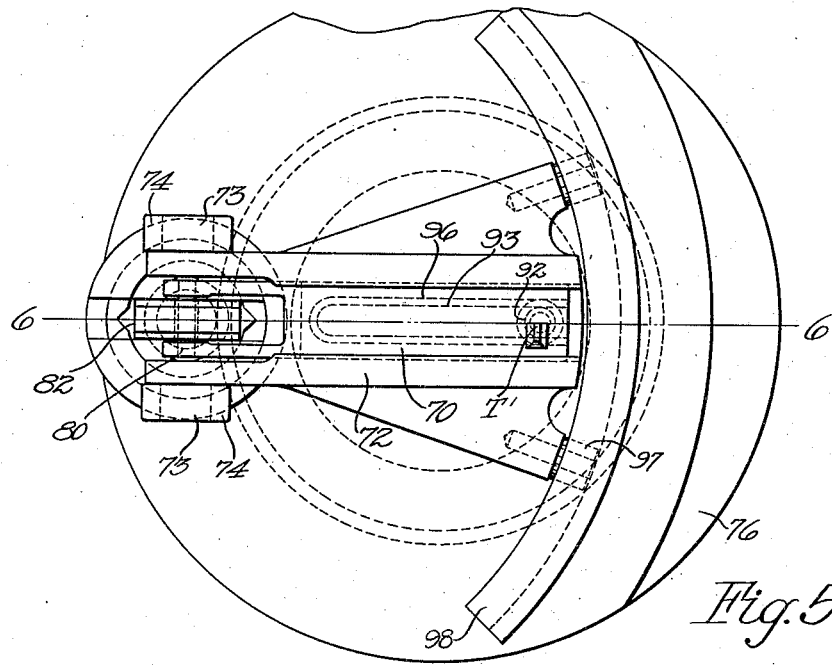
Fig. 5 is a fragmentary view showing a modified form of tool mechanism adapted to operate according to a modification of the invention.

Two different embodiments of the invention have been illustrated in the drawings. In the first embodiment, the cutting tool is swung in a circular arc about a fixed pivot across the face of the continuously rotating gear blank and the lengthwise tooth curve cut on the blank is the resultant of the tool motion and the rotation of the blank. The tool cuts on its stroke in one direction and is withdrawn from cutting position on its return stroke, the continuous rotation of the blank causing the blank to be indexed on the return stroke of the tool so that the tool cuts in a different tooth slot of the blank on each successive cutting stroke.

In the other illustrated embodiment of my invention, the blank has a continuous indexing rotation and the tool is swung about a fixed pivot, as before, but the tool, in addition, is also moved radially of its pivot at a uniform rate during its swing. The tool is withdrawn from cutting position and is returned the amount of its previous radial advance on its return stroke and the continuous rotation of the blank serves during the return stroke, as before, to index the blank. The radial movement of the tool is in proportion to the continuous indexing rotation of the work. It is at a rate such as to compensate for or offset the continuous movement of the blank and it causes the tool path to move in the same direction as the blank. The tooth produced then is curved in development substantially along a circular arc.

In both embodiments of the invention illustrated, the tool is driven by a crank and the crank motion is imparted to the tool through the crank-pin which travels in a longitudinal slot in the tool carrier. For moving the tool to and from cutting position at opposite ends of its stroke, the tool carrier is mounted to swing about an axis at right angles to the axis about which it swings for cutting and the movement of the tool to and from cutting position is effected very simply and without any additional drive by operation of a roller, which is mounted on the crank-pin, and which engages in a cam groove formed in the side wall of the elongated slot in the tool carrier.

Reference will now be made to the drawings for a more complete description of the invention and the embodiment illustrated in Figs. 1 to 4 inclusive will first be described.

10 denotes a portion of the upright or frame of a gear cutting machine constructed according to this invention and 11 a circular cradle which is journaled in the frame. The tool mechanism of the machine is mounted upon a slide 12 which is adjustable on the straight radial guide-ways 14 of the cradle.

The slide 12 carries a rotatably adjustable support 15 which may be adjusted to any angle about the center O.

Secured to the support 15 by screws 16 is a plate 18 which carries an integral pivot stud or pin 20 (Fig. 4). Journaled on the stud 20 for movement about an axis X is a sleeve member 21 which has arms 22 projecting from either side of it that are formed with half-round bearing surfaces as shown in Fig. 2.

The tool carrier is denoted at 25. It is bifurcated at one end and the furcations 26 are formed with concave upper bearing surfaces which engage and seat upon the under surfaces of the half-round portions of the arms 22 so that the tool carrier may swivel on the arms 22 about the axis Y at right angles to the axis X. Bearing blocks 27, which are interposed between the under faces of the furcations 26 and the ledges 28 formed on the sleeve member 21, cooperate in guiding the furcations 26 of the tool carrier in the pivotal movement of the tool carrier about the axis Y. The sleeve member 21 is held on the pivot stud 20 by a nut 29 which threads on the upper end of the stud and a bushing is interposed between the sleeve member and the stud to provide a bearing for the sleeve member in its swinging movement about the axis X.

The cutting tool T is secured in a block 30 which is adjustable angularly in a second block 31 to permit adjusting the tool in accordance with the pressure angle of the teeth of the gear to be cut. The block 31 is adjustable radially of the pivot X in a slot 32 formed in the outer face of the tool carrier arm 25. Suitable means (not shown) are, of course, provided for securing the tool blocks and rotary support 15 and slide 12 in adjusted positions.

The drive to the tool carrier is effected from the center of the cradle 11 through a pair of bevel gears 35. One of said gears is slidably keyed to a radial shaft 36 which is axially fixed to the slide 12 and which carries a bevel pinion 37 that meshes with a bevel gear 38. The gear 38 is secured to the back of a crank-plate 40 which is rotatable about the axis O.

The crank-pin 41 which may be adjustable on the crank-plate, but which is preferably made integral with the crank-plate, as shown, carries a roller 42 which engages in a straight slot 44 formed in the tool carrier 25 radially of the axis X of swing of the carrier. Hence, as the crank-plate rotates, the tool carrier is caused to be swung about its pivot-axis X.

The roller 42 is also formed with a double-conical projection 45. This projection engages in a cam-groove 46 formed in the side walls of the radial slot 44.

The cam-groove 46 is formed with dwell portions 47 and 48 at opposite ends which are connected by a portion 49 inclined to the two dwell portions of the groove.

During the cutting stroke of the tool, the double-conical projection 45 travels in the dwell portion 47 of the groove. When the projection reaches the bend 49 in the groove, the tool carrier 25 is swung about its pivot Y and the tool is withdrawn from cutting position. During the return stroke of the tool carrier, the projection 45 travels in the dwell portion 48 of the cam-groove, holding the tool in withdrawn position, as shown in Fig. 3. At the end of the return stroke, the projection 45 again enters the portion 49 of the groove and the tool is swung back to cutting position.

The tool carrier is rigidly supported during the cutting stroke by means of the rollers 50 which are mounted upon the tool carrier and which engage the plane under-face 51 of the arcuate flange 52 which is formed on the rotatable support 15. The rollers 50 are kept pressed against the surface 51 during cutting by the engagement of the projection 45 in the dwell portion 47 of the cam-groove 46. The projection 45 has, therefore, the double purpose of lifting the tool out of engagement with the blank during the return stroke of the tool and of maintaining the rollers 50 in engagement with the surface 51 during the cutting stroke of the tool. Contact of the rollers being thus assured, they provide together with the arms 22 and bearing blocks 27, a three-point mounting for the tool carrier.

In this embodiment of the invention, it will be seen that the tool moves in a circular arc about the axis X in its cutting stroke. The gear blank to be cut is so mounted and driven that it rotates continuously at a uniform velocity during the operation of the machine. The continuous rotation of the blank functions during the return stroke of the tool to index the blank and combines with the tool movement during the cutting stroke of the tool to produce the lengthwise tooth shape of the gear teeth.

The principle of operation of the embodiment of the invention so far described is illustrated in Fig. 7. G denotes a fragmentary portion of a crown gear or bevel gear in development. The axis of this gear is at 55. The cutting tool is indicated at T, as before. The tool in cutting is swung in a circular arc 56 about the axis X. The gear G is rotating continuously, however, about the axis 55 so that, although the tool itself is moving along the arc 56, the tooth curve produced on the blank will be some other curve which is a resultant of the tool and blank motions. In Fig. 7, the blank is assumed to be rotating in the direction of the arrow 57 with the result that the tooth curve produced on the blank will be a curve such as indicated at 58. This curve has a changing radius, the radius of the curve at the small end of the tooth being less than the radius of the curve at the large end of the tooth.

In the machines which have heretofore been built for cutting spiral bevel gears in a continuous indexing operation with a planing tool, the tool has been given a straight line reciprocating motion and has been driven by a crank. To avoid an S-shape of gear teeth, and to reduce the variation in the side-clearance angle of the tool to a minimum, it has been necessary to provide a variable rocking motion of the cradle. With the method of the present invention which has been described, there is no S-shape curve produced on the gear teeth despite the fact that the tool is driven at a varying velocity by the crank. This is because the tool is moved in a curved path. Instead, there is a change in the radius of curvature of the gear teeth from end to end of the teeth, as illustrated in Fig. 7. There is, therefore, with the described embodiment of the present invention, no need for a cradle rocking motion.

Whether the curvature radius of the gear tooth decreases or increases from the outer end to the inner end of the teeth depends upon the position of the tool and the direction of rotation of the blank. It has been found that when the tool cuts against the rotation of the blank, the radius of curvature is increased from the outer to the inner end of the gear tooth while when the tool cuts with the direction of the rotation of the work, the radius of curvature of the gear tooth is reduced from the outer to the inner end of the tooth so that the curvature radius is smaller at the inner end of the tooth than at the outer end thereof.

In principle, the latter tooth shape is somewhat more desirable for reasons of adjustment. I have discovered, however, that the rate of change of the radius of curvature from the outer to the inner end of the tooth is slight and its effect is practically negligible so that we may just as well cut against the blank rotation as with it. In practice, it is somewhat preferable to cut against the rotation of the work.

In the tool mechanism described for practicing the invention, the length of the tool stroke may be conveniently varied by changing the radius of the cutter path, by adjusting the block 31 radially on the tool carrier arm 25. For this reason, it is unnecessary to provide a radial adjustment of the crank-pin 41 and roller 42.

With the present invention, the tool T may be a double-edged cutting tool so that it can finish-cut opposite sides of a tooth space simultaneously. If a bevel or hypoid gear tooth is straight or if its curvature is very slight, as is the case with large spiral bevel and hypoid gears cut on existing machines where the tool travels in a straight path across the face of the gear blank and the tooth curve produced is the resultant of the tool and the blank motions, the tooth at the outer end will be too thick and at its inner end too thin and too weak. Hence, prior practice heretofore has been to cut large spiral bevel and hypoid gears one side at a time. When a gear is cut "spread-blade" by the method of the present invention, however, the tooth may be provided with a natural taper, namely, the same tooth taper as if the gear were cut one side at a time in the conventional manner. In other words, the tooth is curved just so much that the tooth bottom has a constant width. In each section along the teeth, the width of the tooth space is equal to the thickness of the tooth or it may be made a constant amount smaller or larger than the tooth thickness. The use of an oscillatory cutting tool permits, moreover, of simple and practicaly unlimited control of the length of the tooth bearing or contact between the mating tooth surfaces of a pair of meshing gears for the radius of curvature of the tooth surfaces can be varied at will by adjusting the radius of the cutting tool from its center of swing.

The modification of the invention illustrated in Figs. 5, 6 and 8 will now be described.

Here the cutting tool T' is mounted upon a radially movable slide 70 that is slidable in guideways formed in the swinging tool carrier arm 72. The tool carrier arm 72 has hinge-pins 73 projecting from either side thereof at its rear end. The pins are journaled in bearings 74 formed on the outer end of a sleeve-member 75 which is journaled in the rotatably adjustable support 76 for swinging movement about the axis X'. The support 76 resembles the support 15 previously described and is mounted for angular adjustment upon a slide 77 which in turn is radially adjustable on the cradle 78.

The slide 70 is forked at its inner end and carries a pin 80 which engages in a slot 81 in a rotatably adjustable disc 82. The disc 82 is mounted in a barrel 83 which is adapted to slide axially in the sleeve-member 75. The slot 81 in the disc 82 is straight and the disc is adapted to be adjusted angularly in the barrel 83 to incline the slot 81 to the axis of the barrel so that as the barrel is moved axially, a uniform motion will be imparted to the tool slide radially of the axis of the barrel, that is, of the axis X' of swing of the tool.

The axial motion is imparted to the barrel by a cam 85 which engages a roller 86 that is mounted upon a pin 87 which is secured in the barrel. The cam 85 may be integral with or secured to the crank-plate 90, which is driven in a manner similar to the crank-plate 40 through the bevel gear 91.

As is the case with the crank-plate 40, the crank-plate 90 carries a roller 92 which engages in a slot 93 which is radial of the axis of swing X' of the tool arm. Likewise, the roller 92 is provided with a double-conical projection 95. This engages in a cam-groove 96 formed in the side walls of the slot 93 so that as the crank-plate rotates the roller 92 through its engagement with the slot 93 imparts a swinging movement to the tool T' about the axis X' and the tool is moved to and from cutting position at opposite ends of its stroke through engagement of the projection 95 in the cam-groove 96.

The cam-track 85 has a helical portion of a uniform lead for action during the cutting stroke of the tool. The tool is held in cutting position by the projection 95 and the rollers 97 carried by the swinging tool arm 72 and which engage the under face of the arcuate flange 98 of the rotatably adjustable support 76.

Figure 6:
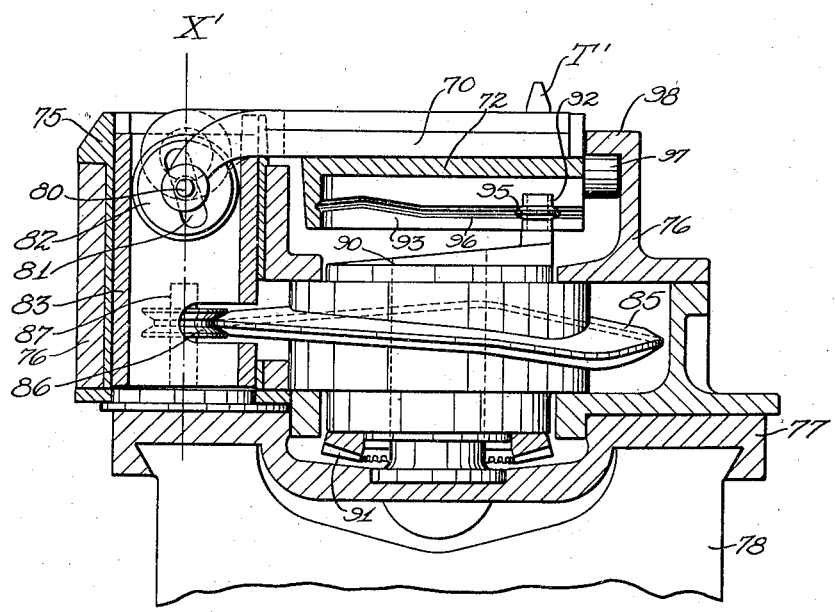
Fig. 6 is a sectional view taken substantially on the line 6—6 of Fig. 5.

In Fig. 6, the disc 82 is shown as adjusted to impart an outward movement to the tool slide 70 and the tool as the barrel 83 is lifted by the cam 85. The disc 82 is adjusted so that the rate of outward movement of the tool radially of the axis X' will correspond to the rate of rotation of the blank away from the tool. If the blank rotates in the opposite direction, the disc 82 will be adjusted to move the tool radially inwardly as the tool cuts across the face of the blank.

The principle of operation of the second described embodiment of the invention will be clear from Fig. 8. Here it is assumed that the tool moves radially outwardly as it takes its cut. Two positions of the tool T' are shown, one at the beginning of the cut and the other at the end of the cut. Between these positions, the tool will have been moved radially away from its axis of swing X' a distance $d$ corresponding to the distance that the developed gear blank or crown gear G' has rotated in the direction of the arrow 100 between the time that the tool begins to cut at one end of a tooth and finishes its cut at the other end of the tooth. The positions of a side of the tooth space being cut at the beginning of the cutting operation and at the end thereof, respectively, are indicated by the full and dotted lines 102 and 102', respectively. Due to the radial motion of the tool during its swing across the face of the blank, the tooth curve produced on the blank is substantially a circular arc.

To avoid any possibility of interference between the cutting tool and the tooth surface when the tool is being swung out of the cut at the end of its cutting stroke or returned into engagement with the blank at the end of its return stroke, the cam 85 can be so formed that when the tool is to be withdrawn from cutting position, the motion of the barrel 83 will be reversed so that the tool is displaced to the left of the path which it would otherwise describe relatively to the rotating blank and interference at this point in the stroke is avoided. Likewise, the cam 85 may be formed so that when the tool is moved back into cutting position again, an increased upward motion may be imparted to the barrel 83 with consequent increased outward motion of the tool so that again interference may be avoided between the tool and the tooth surface.

As stated, due to the uniform radial movement of the tool during cutting in this second embodiment of the invention, the curve produced on the gear blank is substantially a circular arc. The tooth normal always passes through the axis of swing X' of the tool and it is apparent that the entire cutting stroke of the tool may, therefore, be used for cutting up to the very point of reversal. Further, since the tooth normal always passes through the cutting pivot X', the tool may be set in constant angular relationship to the tooth normal and no relative spiral angle setting of the tool about an axis parallel to the cradle axis is required as is the case in machines of the prior art or in the first embodiment of this invention.

The second described embodiment of the invention has, therefore, certain advantages over the first described embodiment thereof. The cutting stroke, as stated, may be substantially equal to the total forward stroke of the tool. Therefore, the cutting speed may be increased because the cut can be started while the tool is travelling at the relatively slow speed which characterizes the beginning of the forward movement of a reciprocable member under actuation of the crank and speeded up in the cut. Due to the possibility of using substantially the whole of the forward stroke of the tool as the cutting stroke, it is also possible to cut closer to the shoulder with the second embodiment of the invention than with the first and for the same reason, also, the chuck length may be kept to a minimum. A further advantage of the second embodiment of the invention is the simplified computation, for the tooth curve cut is substantially a circular arc and not a resultant of the combined motion of the tool and the blank.

Either embodiment of the invention has distinct advantages for the cutting of gears of the sizes which are now cut with the extremely large face-mill gear cutters. The tool handling is very simple and the lifting of heavy face-mill cutters is avoided. Moreover, changes in radius of curvature, as already described, can be made very simply with a single tool as compared with the shimming of the plurality of blades of a large face-mill gear cutter.

The present invention may be practiced in the cutting of gears either with or without a generating roll. Where a generating roll is employed, as in prior machines for cutting gears in a continuous indexing process, either the tool or the blank may be mounted upon the cradle; means will be provided for rotating the cradle continuously; and a differential or equivalent means will be provided for maintaining timed relation between the tool and blank movements as the cradle rotates.

While the invention has been described in connection with certain particular embodiments thereof, it will be understood that it is capable of further modification and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting longitudinally curved tooth gears which comprises imparting a swinging movement to the cutting tool about a fixed axis while rotating the blank continuously on its axis and moving the tool to and from cutting position at opposite ends of its swinging movement so that it cuts on its movement in one direction and is out of cutting position on the return stroke.

2. The method of cutting longitudinally curved tooth gears which comprises swinging the cutting tool in a circular arc while rotating the blank on its axis continuously, the cutting tool being in cutting position on its stroke in one direction and out of cutting position on its return stroke.

3. The method of cutting longitudinally curved tooth gears which comprises rotating the gear blank on its axis continuously while oscillating the cutting tool about a fixed axis first in one direction and then in the other and simultaneously moving the tool first in one direction and then in the other radially of its axis of swing, the tool cutting on its stroke in one direction and being held out of cutting position on its return stroke and the tool being moved back radially on its return stroke the distance of its radial travel on its cutting stroke.

4. The method of cutting longitudinally curved tooth gears which comprises rotating a gear blank on its axis continuously at a uniform velocity while oscillating the cutting tool about a fixed axis first in one direction and then in the other and simultaneously moving the tool radially toward and from its axis of swing, the tool being in cutting position on its stroke in one direction and being held out of cutting position on its return stroke and being returned radially on its return stroke the amount of its radial movement on its cutting stroke and the rate of movement of the tool radially of its axis of swing during cutting being uniform and corresponding to the rate of the blank rotation.

5. The method of cutting longitudinally curved tooth gears which comprises cutting opposite sides of the tooth spaces of the gear simultaneously by swinging a double-edged cutting tool across the face of a continuously rotating gear blank, the tool being in cutting position as it swings in one direction and being out of cutting position on its return stroke.

6. The method of cutting longitudinally curved tooth gears which comprises moving the cutting tool about a relatively fixed center across the face of a continuously rotating gear blank and varying, at a rate corresponding to the rate of rotation of the blank, the distance of the tool from said center as it moves across the face of the blank.

7. In a machine for producing gears in a continuous indexing process and having means for rotating the blank continuously, a tool support mounted to oscillate about a relatively fixed axis, a tool mounted on said support, means for swinging the tool support about said axis, and means for moving the tool to and from cutting position at opposite ends of the stroke of the swinging support.

8. In a machine for producing gears in a continuous indexing process and having means for rotating the blank continuously, a tool support, means for reciprocating the tool support in a circular arcuate path, a tool mounted on the tool support, and means for moving the tool to and from cutting position at opposite ends of the stroke of the tool support.

9. In a machine for cutting gears in a continuous indexing process and having means for rotating the blank continuously, a tool support mounted to oscillate about a relatively fixed axis, a tool holder mounted on said support for movement radially toward and from said axis, means for oscillating the tool support, means for simultaneously moving the tool holder respectively toward and from the axis of swing of said support as said support oscillates in opposite directions, and means for moving the tool to and from cutting position at opposite ends of the stroke of said support.

10. In a machine for producing gears in a continuous indexing process and having means for rotating the blank continuously at a uniform velocity, a tool support mounted to oscillate about a relatively fixed axis, a tool holder slidably mounted on said support for movement radially toward and from said axis, a crank for oscillating the tool support, means for reciprocating the tool holder on said support during the swinging movement of the support to move the holder toward and from the axis of said support during movement of the support respectively in opposite directions, and means for moving the tool to and from cutting position at opposite ends of the stroke of the support.

11. In a machine for producing gears in a continuous indexing process and having means for rotating the gear blank continuously, a tool support mounted to oscillate about a relatively fixed axis, a tool mounted on said support, a crank for oscillating said support, and means for moving the tool to and from cutting position at opposite ends of the stroke of said support.

12. In a machine for producing gears in a continuous indexing process and having means for rotating the blank continuously, a tool support mounted to oscillate about a relatively fixed axis, a tool holder slidable on said tool support radially of said axis and a member movable axially of the axis of swing of the tool support for imparting said radial movement to the tool holder and means for actuating said member in time with the oscillation of said tool support.

13. In a machine for producing gears in a continuous indexing process and having means for rotating the blank continuously, a tool support mounted to oscillate about a relatively fixed axis, a tool holder slidable on said tool support, a member reciprocable axially of the axis of swing of the tool support, a disc mounted on said last named member and having a straight slot therein and rotatably adjustable on the last named member to incline said slot to the axis of the tool support, and means connected to said tool holder engaging in said slot to impart radial movement to the tool holder as said member is reciprocated, means for oscillating said tool support, means for simultaneously reciprocating said member, and means for moving the tool to and from cutting position at opposite ends of the stroke of the tool holder.

14. A tool mechanism comprising a tool support which is reciprocable in one plane to impart cutting and return movements to the tool and which is movable in a direction inclined to said plane to move the tool to and from cutting position, said tool support having a slot formed therein and a cam-groove formed in the walls of said slot, a rotary crank, a pin carried by said crank engaging in said slot to impart reciprocating movement to the tool support on rotation of the crank, a roller carried by said crank-pin engaging in said cam-groove to move the tool support to and from cutting position at opposite ends of its reciprocating stroke, and means for rotating the crank.

15. A tool mechanism comprising a tool support which is reciprocable in one plane to impart cutting and return movements to the tool and which is pivoted for movement to and from said plane to move the tool to and from cutting position, said tool support having a slot formed therein and a cam-groove formed in the walls of said slot, a rotary crank, a pin carried by said crank and engaging in said slot to impart reciprocating movement to the tool support on rotation of the crank, a roller carried by the crank-pin and engaging in said cam-groove to move the tool support to and from cutting position at opposite ends of its reciprocating stroke, and means for rotating the crank.

16. In a machine for producing gears in a continuous indexing process and having means for rotating the blank continuously, a tool support pivotally mounted for swinging movement in one plane about a relatively fixed axis and movable toward and from said plane for movement to and from cutting position, a crank for oscillating said support about its axis to impart cutting and return movements to the tool, means carried by said crank for moving the tool support to and from cutting position at opposite ends of its oscillating movement, and means for rotating the crank.

17. In a machine for producing gears in a continuous indexing process, a tool support pivotally mounted for swinging movement in one plane about a relatively fixed axis and pivotally mounted for swinging movement toward and from said plane about an axis inclined to the first named axis, a rotary crank for imparting swinging movement to the tool support about the first named axis to impart cutting and return strokes to the tool, and means carried by the crank adapted at opposite ends of the stroke of said support to move said support about the second named axis to move the tool to and from cutting position.

18. In a machine for producing gears in a continuous indexing process, a frame, a tool support pivotally mounted on said frame, a tool holder slidably mounted on said tool support for movement radially toward and from the axis of swing of the tool support, a sleeve member movable axially of the pivot of said tool support, a cam carried by said sleeve member and having an operative connection with said tool holder to impart radial movement to the tool holder as the sleeve member moves axially, means for oscillating the tool holder, and means for simultaneously reciprocating said sleeve member.

ERNEST WILDHABER.